(12) United States Patent
Zhou

(10) Patent No.: US 10,467,451 B2
(45) Date of Patent: Nov. 5, 2019

(54) METHOD FOR CONTROLLING UNLOCKING AND TERMINAL

(71) Applicant: Guangdong Oppo Mobile Telecommunications Corp., Ltd., Dongguan, Guangdong (CN)

(72) Inventor: Yibao Zhou, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/584,913

(22) Filed: May 2, 2017

(65) Prior Publication Data

US 2017/0344784 A1    Nov. 30, 2017

(30) Foreign Application Priority Data

May 30, 2016 (CN) .......................... 2016 1 0375447

(51) Int. Cl.
*G06K 9/00* (2006.01)
*G06F 16/683* (2019.01)
(Continued)

(52) U.S. Cl.
CPC ............. *G06K 9/0004* (2013.01); *G06F 3/01* (2013.01); *G06F 3/042* (2013.01); *G06F 3/0418* (2013.01);
(Continued)

(58) Field of Classification Search
None
See application file for complete search history.

(56) References Cited

U.S. PATENT DOCUMENTS

2002/0146156 A1* 10/2002 Morimura .......... G06K 9/00013
382/124
2003/0194114 A1* 10/2003 Mitsuyu ............. G06K 9/00026
382/124
(Continued)

FOREIGN PATENT DOCUMENTS

CN         102262492 A      11/2011
CN         102737194 A      10/2012
(Continued)

OTHER PUBLICATIONS

Peralta et al., Fast fingerprint identification for large databases, "Pattern recognition", Feb. 2, 2014, pp. 588-602, vol. 47, No. 2.

(Continued)

*Primary Examiner* — Fred H Hu
(74) *Attorney, Agent, or Firm* — Young Basile Hanlon & MacFarlane, P.C.

(57) ABSTRACT

A method for controlling unlocking is provided. The method includes the following operations. A touch operation of a finger of user on a fingerprint recognition sensor of a terminal is detected. A first fingerprint image is received according to a preset capacity auto control (CAC) parameter corresponding to a default finger, the finger of the user is in the steady state. N second fingerprint images are received according to N sets of CAC parameters; N is an integer greater than 1. A target fingerprint image is determined and matched. The terminal is unlocked when the target fingerprint image is matched.

18 Claims, 8 Drawing Sheets

(51) Int. Cl.
   *G06K 9/03*   (2006.01)
   *G06F 3/01*   (2006.01)
   *G06F 3/041*  (2006.01)
   *G06F 3/042*  (2006.01)
   *G06F 21/32*  (2013.01)

(52) U.S. Cl.
   CPC ............ *G06F 16/683* (2019.01); *G06F 21/32* (2013.01); *G06K 9/0002* (2013.01); *G06K 9/00013* (2013.01); *G06K 9/00026* (2013.01); *G06K 9/036* (2013.01); *G06F 2203/0338* (2013.01); *G06F 2203/04808* (2013.01); *H04M 2250/22* (2013.01)

(56) References Cited

U.S. PATENT DOCUMENTS

| | | | |
|---|---|---|---|
| 2012/0060123 A1 | 3/2012 | Smith | |
| 2015/0070137 A1* | 3/2015 | Minteer | G06K 9/00013 340/5.83 |
| 2015/0310250 A1 | 10/2015 | Fenrich et al. | |
| 2016/0239150 A1* | 8/2016 | Lee | G06K 9/00013 |
| 2017/0242995 A1* | 8/2017 | Bassenye-Mukasa | G06F 16/24575 |
| 2017/0374065 A1* | 12/2017 | Shtraym | H04L 63/0861 |

FOREIGN PATENT DOCUMENTS

| | | |
|---|---|---|
| CN | 105095722 A | 11/2015 |
| CN | 105335707 A | 2/2016 |
| CN | 105404807 A | 3/2016 |
| CN | 105550647 A | 5/2016 |
| CN | 106022068 A | 10/2016 |
| WO | 9926187 A1 | 5/1999 |
| WO | 9929187 A1 | 6/1999 |

OTHER PUBLICATIONS

Partial supplementary European search report issued in corresponding European application No. 17168403.8 dated Oct. 25, 2017.
International Search Report issued in corresponding International Application No. PCT/CN2017/081545 dated Jul. 11, 2017 (12 pp).

* cited by examiner

METHOD FOR CONTROLLING UNLOCKING AND TERMINAL

CROSS-REFERENCE TO RELATED APPLICATION(S)

This application claims priority to Chinese Patent Application No. 201610375447.6, filed on May 30, 2016, the content of which is incorporated by reference herein in its entirety.

TECHNICAL FIELD

The present disclosure relates to the field of electronic technology, and particularly to a method for controlling unlocking method and a terminal.

BACKGROUND

At present, the fingerprint recognition technology has become a standard configuration of mainstream terminals (such as smart phones, tablet PCs and other terminal equipment). Fingerprint recognition can be used for unlocking, waking, and other functions of the terminal; in addition, fingerprint recognition is an important part of mobile payments. Fingerprint payment also puts forward higher requirements for security while providing users with convenience. Fingerprint recognition process can include feature extraction, data saving, and image matching. First, an original fingerprint image is acquired via a fingerprint recognition sensor, thereafter, the original fingerprint image undergoes preliminary processing so that it can be clearer, and then, the original fingerprint image matches a registered fingerprint template for minutiae. The terminal will be unlocked when matches.

"Unlocking time" refers to a time period from the fingerprint image is acquired by the terminal until system unlocking. The length of the unlocking time has become a competition point of products of terminal manufacturers, and how to shorten the unlocking time of the terminal has become a technical problem to be solved in the field.

BRIEF DESCRIPTION OF THE DRAWINGS

In order to illustrate technical solutions of implementations of the present disclosure more clearly, the drawings used in the description of the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Figure 1:
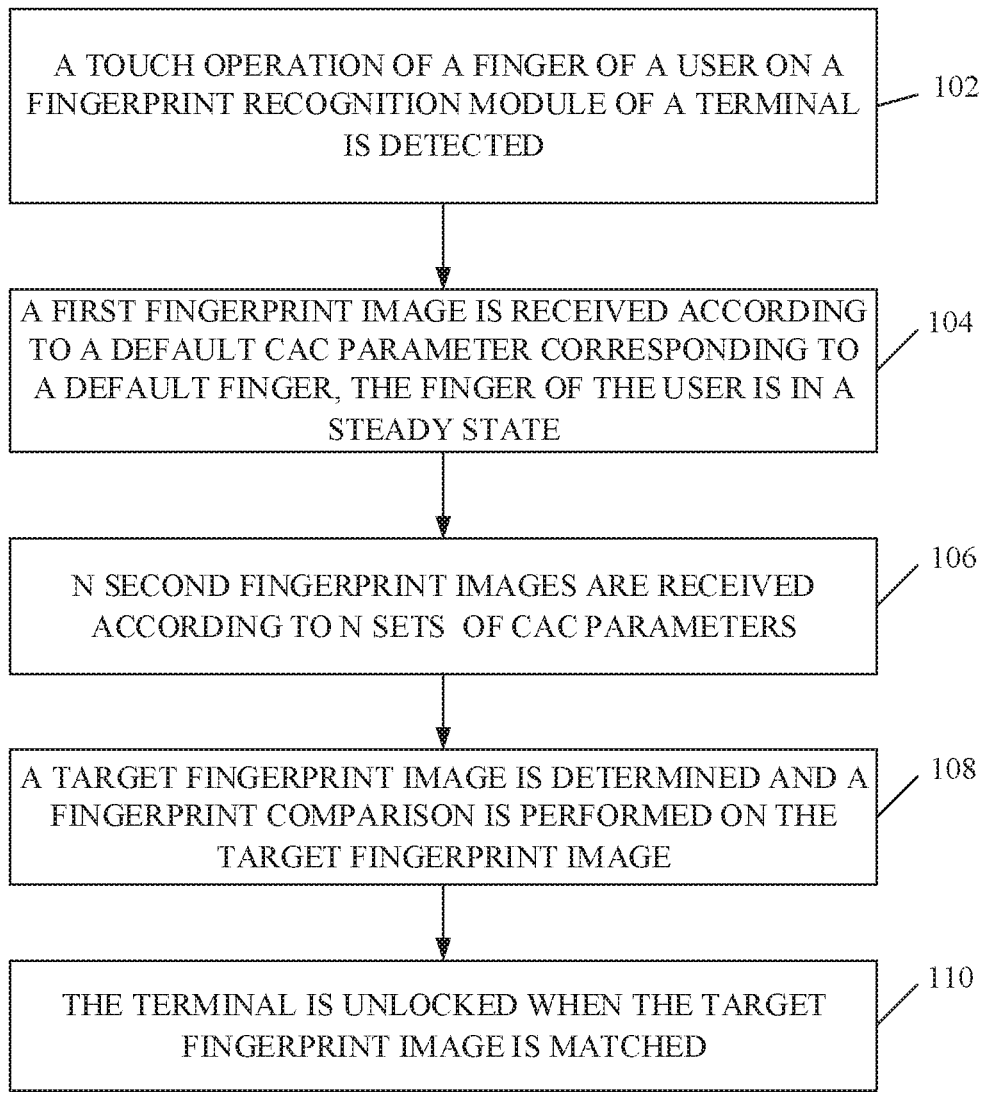
FIG. 1 is a flow schematic diagram illustrating a method for controlling unlocking according to an implementation of the present disclosure.

In order to provide a better understanding of the present disclosure for those skilled in the art, technical schemes of the implementations of the present disclosure will be described in the following description in conjunction with the accompanying drawings clearly and completely. Obviously, the described implementations are merely a part rather than all of the implementations of the present disclosure. All other implementations obtained by those of ordinary skill in the art based on the implementations of the present disclosure without creative labor should fall within the scope of the present disclosure.

The following will be described in detail.

The terms "first", "second", "third", and "fourth" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "implementation" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

In the following, some of the terms used herein are explained to facilitate the understanding for those skilled in the art.

Terminal

Terminal, also known as terminal device, terminal equipment or user equipment (UE), means a device that provides voice and/or data connectivity to a user, examples of which includes hand-held devices with wireless connectivity function, on-board devices and the like. Common terminals include, for example, mobile phones, tablets, laptops, handheld computers, mobile internet devices (MID), and wearable equipment such as smart watches, smart bracelets, and pedometers and so on.

Fingerprint Recognition Sensor

A fingerprint recognition sensor, also known as a fingerprint recognition module or fingerprint sensor, can realize the recognition of individual fingerprint features through a specific induction sensor. At present, the fingerprint recognition sensor is mainly divided into an optical fingerprint sensor, a capacitive fingerprint sensor, and a radio frequency (RF) fingerprint sensor. The fingerprint recognition sensor can be set in combination with a metal dome array (in other words, dome key) of a terminal, and can be set on the front surface, the race surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

Capacity Auto Control (CAC) Parameter

A CAC parameter includes "ADC shift or ADC offset", "ADC gain", and "pixel gain". "ADC shift" refers to the offset of an analog-to-digital converter (ADC).

Assume that the fingerprint recognition sensor includes 56*172 pixels, each pixel in a drawing process corresponds to a pixel value; that is, a total of 10,752 pixel values can be obtained, usually the size of these 10,752 pixel values is between 0.4 and 0.8 and the pixel values for most pixels are different, and then a distribution map can be formed. "ADC gain" refers to the gain of the ADC; the greater the gain, the more dispersed the distribution map, on the other hand, the smaller the gain, the more concentrated the distribution map; the more dispersed the distribution map, the higher the contrast of an image received, and originally darker pixels in the fingerprint image will be even darker while originally whiter pixels in the fingerprint image will be even whiter. "Pixel gain" refers to the gain of a pixel and is determined by a capacitor connected in parallel with an amplifier. The amplifier is connected in parallel with multiple capacitors and each of the capacitors can be controlled by a switch. The more the switch is closed, the greater the gain, the larger the pixel value, and the stronger the signal strength.

During a control process of the ADC, generally, the "pixel gain" is fixed, and therefore, the control process of the ADC is mainly used to adjust the "ADC shift" and the "ADC gain", among which the "ADC shift" is for adjusting the location of the whole distribution map, and the "ADC gain" is for adjusting the distribution or dispersion of the distribution map. Each finger is not the same, and the fingerprint recognition sensor can be used to debug captured images via different parameters. Assuming the "ADC shift" and the "ADC gain" each have five levels, the combination of these two can have 25 combinations, so the fingerprint recognition sensor can receive up to 25 fingerprint images each time.

Feature

Feature or characteristic refers to fingerprint features of a fingerprint image or a fingerprint recognition sensor; the fingerprint feature includes overall features and local features. The overall features in turn include basic pattern patterns such as loop, arch, and whorl. The local features, also known as minutiae, node, or feature point, generally refer to an individual portion of the fingerprint or information representative thereof. Two fingerprints often have the same overall features, however, their local features, that is, the minutiae, cannot be exactly the same. Prints of a fingerprint are not continuous, smooth, or straight, but often break, bifurcated, or curved. These break points, bifurcation points, and turning points are called "minutiae", which can provide confirmation information of the uniqueness of a fingerprint. Minutiae on a fingerprint have the following four different properties. 1) ending, means an end of a print; 2) Bifurcation, means the splitting of a print into two or more than two prints; 3) ridge divergence, means the separating of two parallel prints; 4) dot or island, means a particularly short print that become a little dot; 5) enclosure, means a small ring formed when a print separated into two prints and these two prints immediately merged into one. Fingerprint feature data still includes the follows: 1) short Ridge, means a print which is short but not so short to be a little dot; 2) orientation, means that a minutiae point can toward a certain direction; 3) curvature, describes the speed at which the orientation of a print changes; 4) position, which is described via (x, y) coordinates, can be absolute, or can be inductively recognized relative to triangular points or minutiae.

ADC

The can be built into a fingerprint recognition sensor, and can be used to convert analog signals of a fingerprint image into digital signals.

Wet Finger

Wet finger, also known as sweaty finer, that is, in the absence of exercise, some people's hands will sweat, commonly known as easy sweat body. In this case, the surface of the finger will have a lot of sweat, such finger will be called wet finger.

Fingerprint Template

Figure 8:
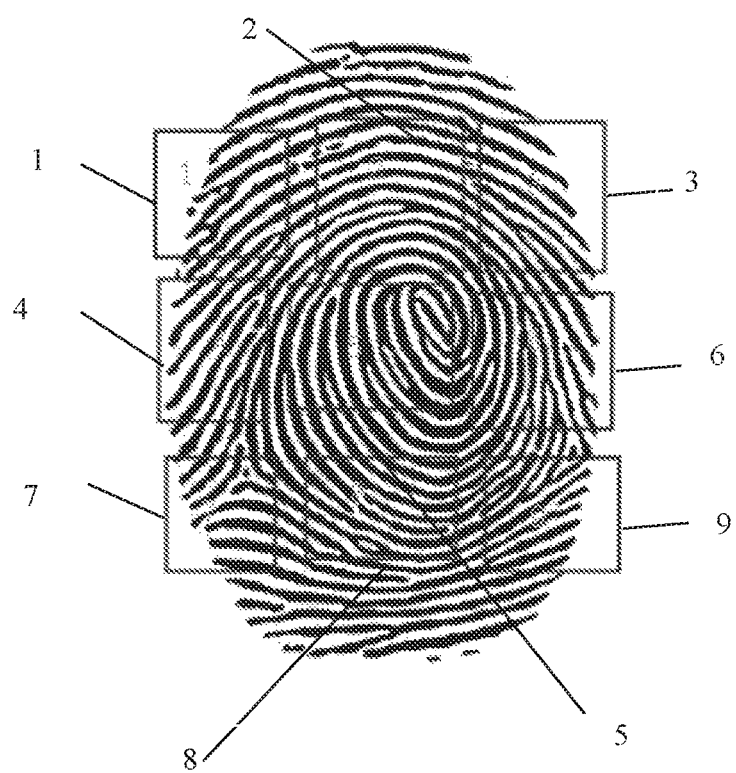
FIG. 8 is a schematic diagram illustrating an example of a fingerprint template.

The term "fingerprint template" and variants thereof, generally refers to a substantially complete fingerprint, or information representative thereof, collected from one or more nodes of a finger. For example, when a fingerprint function of a terminal such as a mobile phone is enabled for the first time, the user may be asked to undergo a fingerprint registration process; during the fingerprint registration, the user put his or her finger on a fingerprint sensor for fingerprint image acquisition or receiving by the fingerprint sensor, and the fingerprint image received will be stored as a fingerprint template, usually, one finger corresponds to one fingerprint template; generally, the fingerprint sensor may receive 10-20 times for each finger in order to receive the whole fingerprint face and generate a comprehensive fingerprint template. Feature information can be obtained from the fingerprint image received, and for example, the fingerprint template can be saved in the form of image. FIG. 8 illustrates an exemplary fingerprint template, and the numbers marked in the fingerprint of FIG. 8 refers to minutiae.

False Rejection Rate (FRR)

FRR refers to the percentage of recognition instances in which false rejection occurs, namely, refers to the probability of error that the same fingerprint is identified as a different fingerprint and rejected. FRR=(the number of fingerprints false rejected/the total number of fingerprints examined)*100%.

Fingerprint Image

Fingerprint image generally refers to images collected or received by the fingerprint recognition sensor; fingerprint image data, fingerprint image information, fingerprint data, or fingerprint information generally refers to information or data of the fingerprint image, and can be stored locally in the terminal such as stored in a database or memory built into the terminal. When we refer to receiving or collecting fingerprint image, this can be understood as receiving fingerprint image information or fingerprint image data, or data required to generate or get a fingerprint image.

In addition, the terms "a plurality of" or "multiple" means two or more than two. The term "and/or" is used to describe the association of associated objects and indicates that there can be three relationships. For example, "A and/or B" means three situations, that is, A alone, both A and B, or B alone. The character "/" generally indicates that the associated objects before and after the character are in an "OR" relationship.

According to an implementation of the present disclosure, there is provided a method for controlling unlocking, in which when a touch operation is detected, the terminal will receive a first fingerprint image based on a default CAC parameter, and receive a plurality of second fingerprint images according to a plurality of different CAC parameters, then the terminal determines a target fingerprint image from the first fingerprint image and the second fingerprint images and perform fingerprint comparison on the target fingerprint image, so as to determine whether to unlock the terminal according to the result of the fingerprint comparison. The method will be described in detail below with reference to the accompanying drawings.

FIG. 1 is a flow schematic diagram illustrating a method for controlling unlocking according to an implementation of the present disclosure. As illustrated in FIG. 1, the method can include the follows.

At block 102, a touch operation of a finger of a user on a fingerprint recognition sensor of a terminal is detected.

At block 104, a first fingerprint image is received according to a CAC parameter corresponding to a default finger when the finger of the user is in the steady state. In at least one implementation, the default finger is a wet finger. A CAC parameter can be deemed as a set of parameters, and generally, each CAC parameter corresponds to one fingerprint image; in at least one implementation, for one CAC parameter, multiple fingerprint images can be received either, in this case, one image having the best quality will be selected as the first fingerprint image corresponding to the CAC parameter. As an implementation, the CAC parameter corresponding to a wet finger can be deemed a default and fixed parameter.

At block 106, N second fingerprint images are received according to N sets of CAC parameters, where N is an integer greater than 1. Once the finger of the user is put on the fingerprint recognition sensor, operations at block 104 and block 106 can be completed instantly in a way that is not perceived by the user. In at least one implementation, the N second fingerprint images can be received during the receiving of the first fingerprint image, that is, the operations at block 104 and block 106 can be performed in parallel.

At block 108, a target fingerprint image is determined and a fingerprint comparison is performed on the target fingerprint image; the target fingerprint image is the best fingerprint image among the first fingerprint image and the N second fingerprint image. For example, the best fingerprint image is a fingerprint image having the best image quality.

At block 110, the terminal is unlocked when the target fingerprint image is matched.

For example, when the user presses the fingerprint recognition sensor, hand shake may occur while the user himself cannot feel. In this case, the fingerprint image obtained by the fingerprint recognition sensor can be vague, and this may affect the follow-up fingerprint comparison. Before the receiving of the fingerprint image for unlocking, the terminal can first determine whether the finger of the user is in the steady state. The fingerprint image for unlocking will be obtained when the finger of the user tends to be stable. This prevents the fingerprint recognition sensor from obtaining a vague fingerprint image due to instability of the hand (in other words, hand shake) of the user, thereby avoiding the improvement of FRR of fingerprint recognition. In addition, the process for receiving the first fingerprint image and the process for receiving the second fingerprint image are performed in parallel so as to shorten the receiving time of part of the fingerprint images as well as improve fingerprint unlocking speed. Moreover, one fingerprint image with the best image quality is selected from the first fingerprint image and multiple second fingerprint images to undergo the fingerprint comparison so as to reduce FRR. The first fingerprint image is received according to the CAC parameter corresponding to the wet finger, which can guarantee that the fingerprint recognition sensor still has one first fingerprint image available in case that none of the N second fingerprint images received is clear because the finger of the use is wet, and the fingerprint recognition FRR can be reduced.

At block 102, the manner in which the terminal determines whether the finger of the user is in the steady state can include at least the follows.

Manner 1

The terminal receives at least two third fingerprint images and determines whether the finger of the user is in the steady state based on the difference between the at least two third fingerprint images.

For instance, the terminal receives M third fingerprint images, the M third print images are fingerprint images received at M time points, and M is an integer greater than 1; the terminal determines the clarity of each of the M third fingerprint images and determines the difference in the clarity of any two of the M third fingerprint images; the terminal determines that the finger of the user is in the steady state when the difference in the clarity of any two of the M third fingerprint images is less than or equal to a first threshold; the terminal determines that the finger of the user is not in the steady state when the difference in the clarity of any two of the M third fingerprint images is greater than the first threshold.

For example, generally, when the finger of the user is in the steady state, the clarity of fingerprint images obtained at different time points by the fingerprint recognition sensor is close. Therefore, the terminal can receive multiple third fingerprint images and then determine the difference in the clarity of any two third fingerprint images. When the difference in the clarity of any two third fingerprint images is less than or equal to the first threshold (such as less than 3% or less than 5% and so on), the terminal can determine that the finger of the user is in the steady state. Otherwise, the terminal can determine that the finger of the user is not in the steady state.

Manner 2

The fingerprint recognition sensor comprises a plurality of sensing electrodes (for example, R sensing electrodes, where R is an integer greater than 1), the terminal receives at least two sets of data via the sensing electrodes of the fingerprint recognition sensor, and where each set of data comprises R capacitance values.

For instance, the terminal acquires S sets of data at S time points via R sensing electrodes of the fingerprint recognition sensor; each set of the S sets of data includes R capacitance values, and R and S are integers greater than 1; the terminal determines the average value of the difference in the capacitance values of any two sets of data; the terminal determines that the finger of the user is in the steady state when the average value of the difference in the capacitance values of any two sets of data is less than or equal to a second threshold; the terminal determines that the finger of the user is not in the steady state when the average value of the difference in the capacitance values of any two sets of data is greater than the second threshold.

For example, generally, when the finger of the user is in the steady state, multiple data received at different time points by the same sensing electrode of the fingerprint recognition sensor will be very close, and the difference between any two data of the multiple data obtained by the same sensing electrode is very small. Therefore, the terminal can judge whether the finger of the user is in the steady state with aid of data obtained by the sensing electrode of the fingerprint recognition sensor without obtaining the fingerprint image, and a specific implementation can be as follows. R sensing electrodes of the fingerprint recognition sensor obtain S sets of data at S time points, each set includes R capacitance values, and then the average value of the difference in the capacitance values of any two sets of data is determined. For example, R=100, S=3, capacitance values included in the first group of data are $K_1$, $K_2$, $K_3 \ldots K_{100}$, capacitance values included in the second group of data are $H_1$, $H_2$, $H_3 \ldots H_{100}$, and capacitance values included in the third group of data are $J_1, J_2, J_3 \ldots J_{100}$, thus, the average value of the difference in the capacitance values of the first group of data and the second group of data is $((K_1-H_1)+(K_2-H_2)+(K_3-H_3)+ \ldots +(K_{100}-H_{100}))/100$; similarly, the average value of the difference in the capacitance values of the second group of data and the third group of data as well as the average value of the difference in the capacitance values of the first group of data and the third group of data can be calculated according to the above-mentioned method. When the average value of the difference in the capacitance values of any two sets of data is less than or equal to the second threshold (such as less than 3, 4, 5 or other values), the terminal can determine that the finger of the user is in the steady state; otherwise, the terminal can determine that the finger of the user is not in the steady state.

In at least one implementation, the CAC parameter includes an offset of an ADC and a gain of the ADC. The method illustrated in FIG. 1 can further include the follows before the operation at block 104.

The terminal determines K offsets of the ADC and H gains of the ADC, where K and H are integers greater than 1. The terminal constructs the N sets of CAC parameters according to the K offsets of the ADC and H gains of the ADC, where each set of the N sets of CAC parameters includes one offset of the ADC and one gain of the ADC.

For example, in order to receive a clearer fingerprint image for unlocking, the terminal can obtain multiple sets of different CAC parameters by adjusting the offset of the ADC and the gain of the ADC. The fingerprint recognition sensor can obtain multiple different fingerprint images based on multiple sets of different CAC parameters and can choose one fingerprint image with the best quality from these fingerprint images so as to reduce FRR of fingerprint recognition. For example, the clarity of the first fingerprint image corresponds to three offsets of the ADC and four gains of the ADC, then there are twelve sets of CAC parameters constructed by the three offsets and the four gains, and twelve different fingerprint images can be obtained.

For example, referring to FIG. 2, the fingerprint comparison performed on the target fingerprint image at block 108 can be implemented as follows.

At block 108-1, the terminal extracts overall features of the target fingerprint image and compares the extracted overall features with overall features of a pre-stored fingerprint template of the terminal.

When the similarity between the extracted overall features and the overall features of the pre-stored fingerprint template is greater than or equal to a third threshold, proceed to block 108-2.

At bock 108-2, the terminal extracts local features of the target fingerprint image and compares the extracted local features with local features of the fingerprint template.

When the similarity between the extracted local features and the local features of the pre-stored fingerprint template is greater than or equal to a fourth threshold, the terminal determines that the target fingerprint image is matched. When the similarity between the extracted local features and the local features of the pre-stored fingerprint template is less than the fourth threshold, the terminal determines that the target fingerprint image is not matched.

For example, in order to further reduce the power consumption of the terminal, the terminal may first extract the overall features of the target fingerprint image (without extracting the local features) during the fingerprint comparison; when the overall features match with the overall features of the fingerprint template (that is, the similarity between the two is greater than or equal to the third threshold, for example, the third threshold can be 70%, 80%, 85%, 90% or other values), the terminal extracts the local features of the target fingerprint image and conduct local features comparison; when the overall features is not matched with the overall features of the fingerprint template, the terminal can directly determine that the fingerprint comparison is not matched. When the local features of the target fingerprint image matches with the local features of the fingerprint template (that is, the similarity between the two is greater than or equal to the fourth threshold, for example, the fourth threshold can be 70%, 80%, 85%, 90% or other values), the terminal determines that the fingerprint comparison is successful. It can be seen that, during the fingerprint comparison, the overall features are extracted first, and the local features are extracted for comparison when the overall features are matched; in this way, it is possible to avoid the problem that the fingerprint comparison is performed when the inputted fingerprint image is not the fingerprint image of the user himself, thereby avoid increasing the power consumption of the terminal.

In at least one implementation, at the above-mentioned block 105, the manner in which the terminal is unlocked can be as follows.

The terminal determines an application interface that is loaded and displayed the most in a preset time period, this operation can be achieved via a counter and/or a timer for example built into the terminal; thereafter, the terminal loads and displays the application interface; the preset time period includes the current system time.

For example, in order to enable the user to directly enter the application interface that the he or she wants to open after unlocking the screen of the terminal, the terminal can determine an application interface that is loaded and displayed the most in a preset time period (the preset time period includes the current system time and can be the current system time±30 min, the current system time±40 min, the current system time±1 h, and other possible values), and then load and display the determined application interface when the result of the fingerprint comparison is matched. For example, suppose the current system time is 6 pm and the preset time period is 6 pm+30 min, an application interface that is loaded and displayed the most in this preset time period is application interface A; when the fingerprint comparison is matched, the terminal can load and display application interface A directly. Furthermore, the process of determining the application interface can be conducted in parallel during the fingerprint comparison so as to further save the unlocking time of the terminal.

Figure 3:
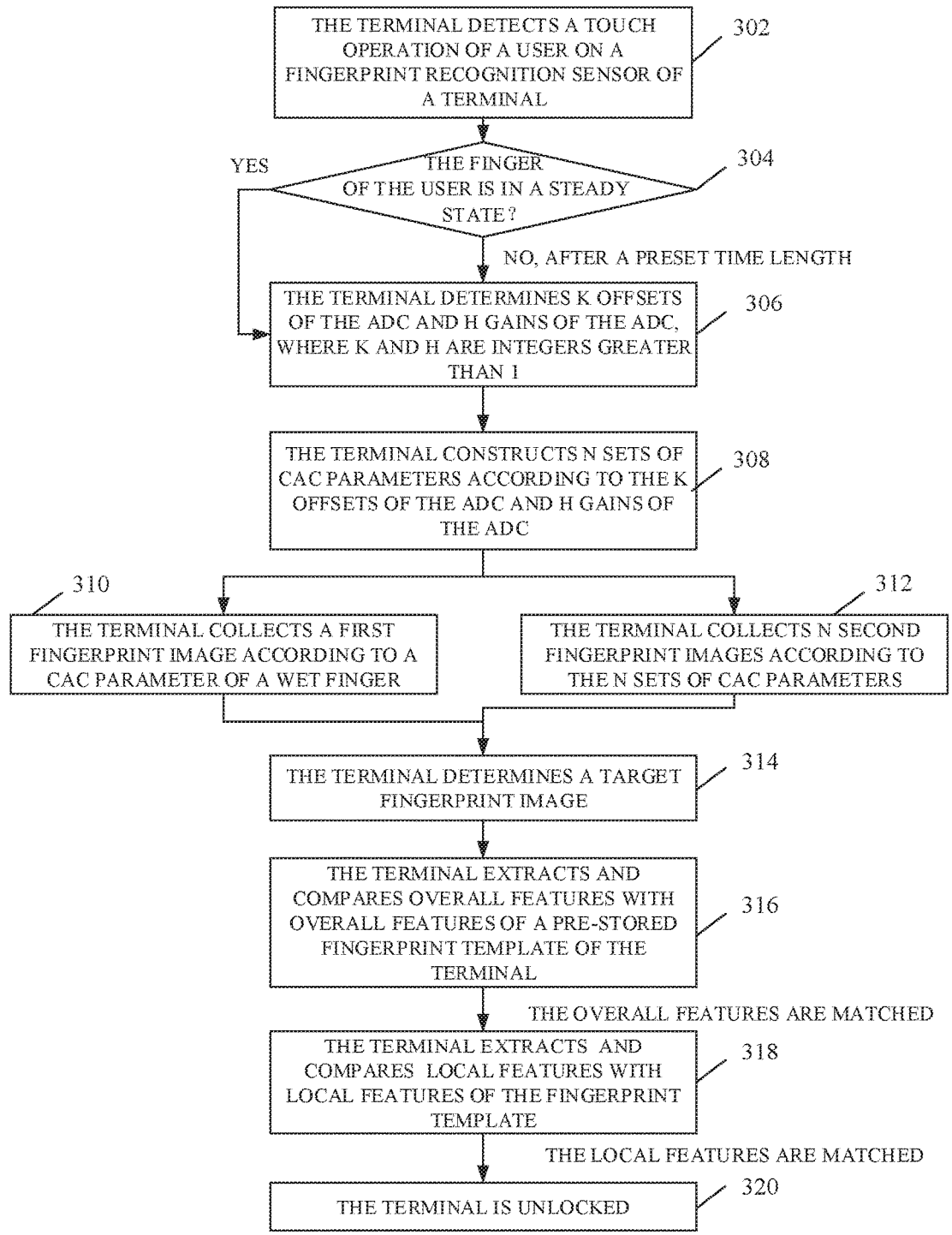
FIG. 3 is a flow schematic diagram illustrating another method for controlling unlocking according to an implementation of the present disclosure.

According to an implementation of the present disclosure, a more detailed method for controlling unlocking is provided. As illustrated in FIG. 3, the method can begin at block 301.

At block 302, the terminal detects a touch operation of a user on a fingerprint recognition sensor of a terminal.

At block 304, the terminal determines whether or not a finger of the user that touches or presses the fingerprint recognition sensor is in a steady state. When the user is in the steady state, proceed to block 306; otherwise, proceed to block 306 after a predetermined time period. The predetermined time period can be predetermined by the terminal, or can be set by the user subsequently. The present disclosure is not limited thereto.

At block 306, the terminal determines K offsets of the ADC and H gains of the ADC, where K and H are integers greater than 1.

At block 308, the terminal constructs N sets of CAC parameters according to the K offsets of the ADC and H gains of the ADC; where N is an integer greater than 1; each set of the N sets of CAC parameters includes one offset of the ADC and one gain of the ADC.

At block 310, the terminal receives a first fingerprint image according to a CAC parameter of a default finger. In at least one implementation, the default finger is a wet finger.

At block 312, the terminal receives N second fingerprint images according to the N sets of CAC parameters. The operations at block 305 and block 306 can be conducted in parallel. The operations at block 310 and block 312 can be performed in parallel.

At block 314, the terminal determines a target fingerprint image; the target fingerprint image is a fingerprint image having the best image quality among the first fingerprint image and the N second fingerprint images.

At block 316, the terminal extracts overall features of the target fingerprint image and compares the extracted overall features with overall features of a pre-stored fingerprint template of the terminal. When the similarity between the extracted overall features and the overall features of the pre-stored fingerprint template is greater than or equal to a third threshold, proceed to block 318.

At block 318, the terminal extracts local features of the target fingerprint image and compares the extracted local features with local features of the fingerprint template.

When the similarity between the extracted local features and the local features of the pre-stored fingerprint template is greater than or equal to a fourth threshold, the terminal determines that the target fingerprint image is matched and proceeds to block 320.

At block 320, the terminal is unlocked.

Figure 2:
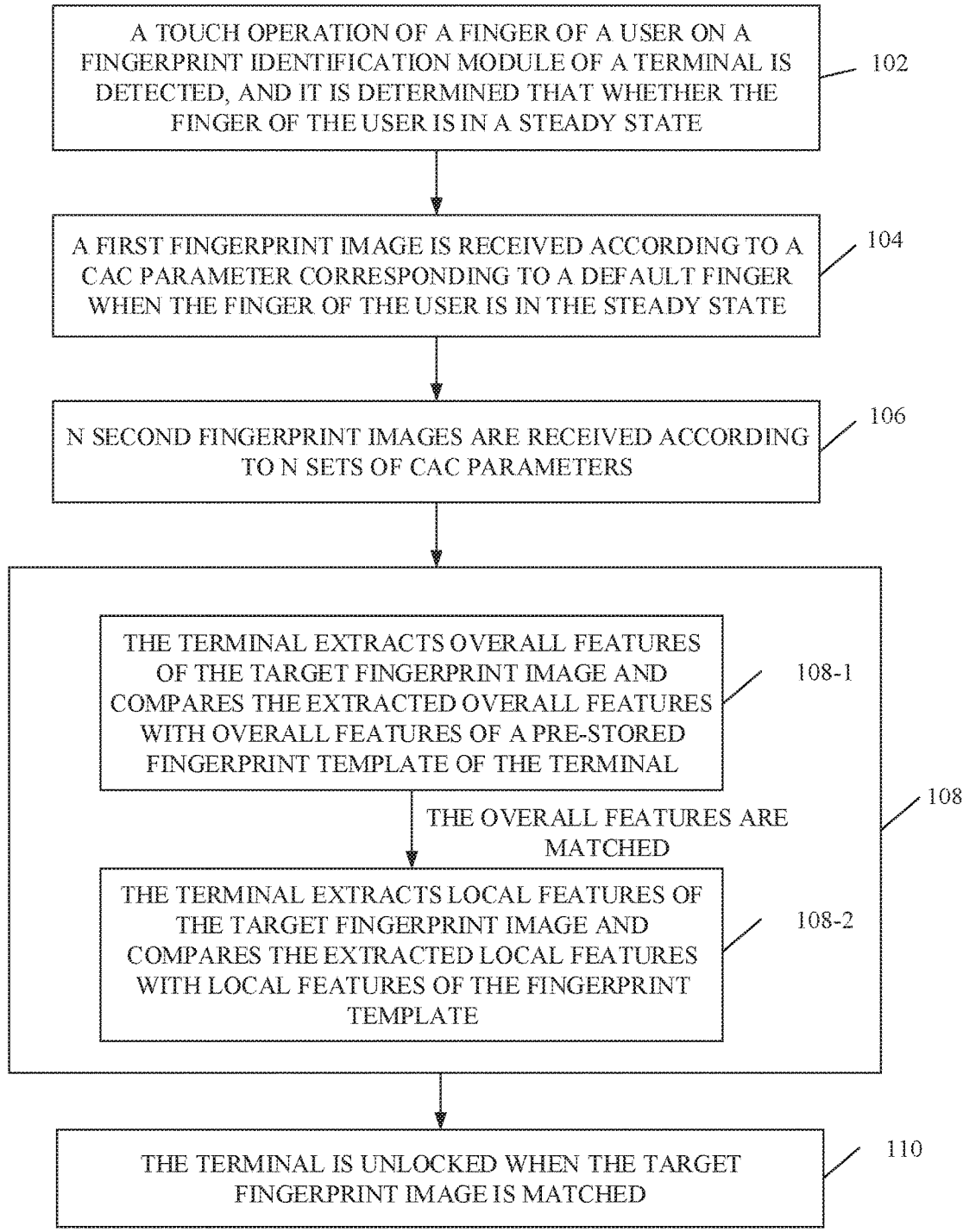
FIG. 2 is a flow schematic diagram illustrating another method for controlling unlocking according to an implementation of the present disclosure.

It is to be noted that, the operation at block 312 can be performed in parallel with the operation at block 310, and details of the implementation of operations from block 302 to block 320 may refer to the method described in FIG. 1 and FIG. 2.

In the foregoing description, one method for controlling unlocking according to an implementation of the present disclosure has been described in detail; in this method, the fingerprint comparison is performed on the target fingerprint image selected from the first fingerprint image and the second fingerprint images. The technical solution of the present disclosure is not limited thereto. For example, another method for controlling unlocking is provided as follows.

A touch operation of a finger of a user on a fingerprint recognition sensor of a terminal is detected; a first fingerprint image according to a CAC parameter corresponding to a default finger is received, and the finger of the user is in a steady state; a fingerprint comparison is performed on the first fingerprint image, at the same time, N second fingerprint images are received according to N sets of CAC parameters, N is an integer greater than 1; once the first fingerprint image is matched, the receiving of the N second fingerprint images will be terminated and the terminal will be unlocked.

When the fingerprint comparison of the first fingerprint image is not matched, a target fingerprint image is determined and a fingerprint comparison is performed on the target fingerprint image; the target fingerprint image is a fingerprint image having the best image quality among the N second fingerprint image. When the target fingerprint image is matched, the terminal will be unlocked. For other details of this method not mentioned herein, please refer to the forgoing description and will not repeated here.

As can be seen, in this method for controlling unlocking, the terminal will be unlocked when the first fingerprint image or the target fingerprint image is matched. By means of this method for controlling unlocking, the fingerprint comparison on the first fingerprint image is performed during the reception of the second fingerprint image, therefore, fingerprint reception time is fully utilized and the unlocking time of the terminal can be further shortened.

Figure 4:
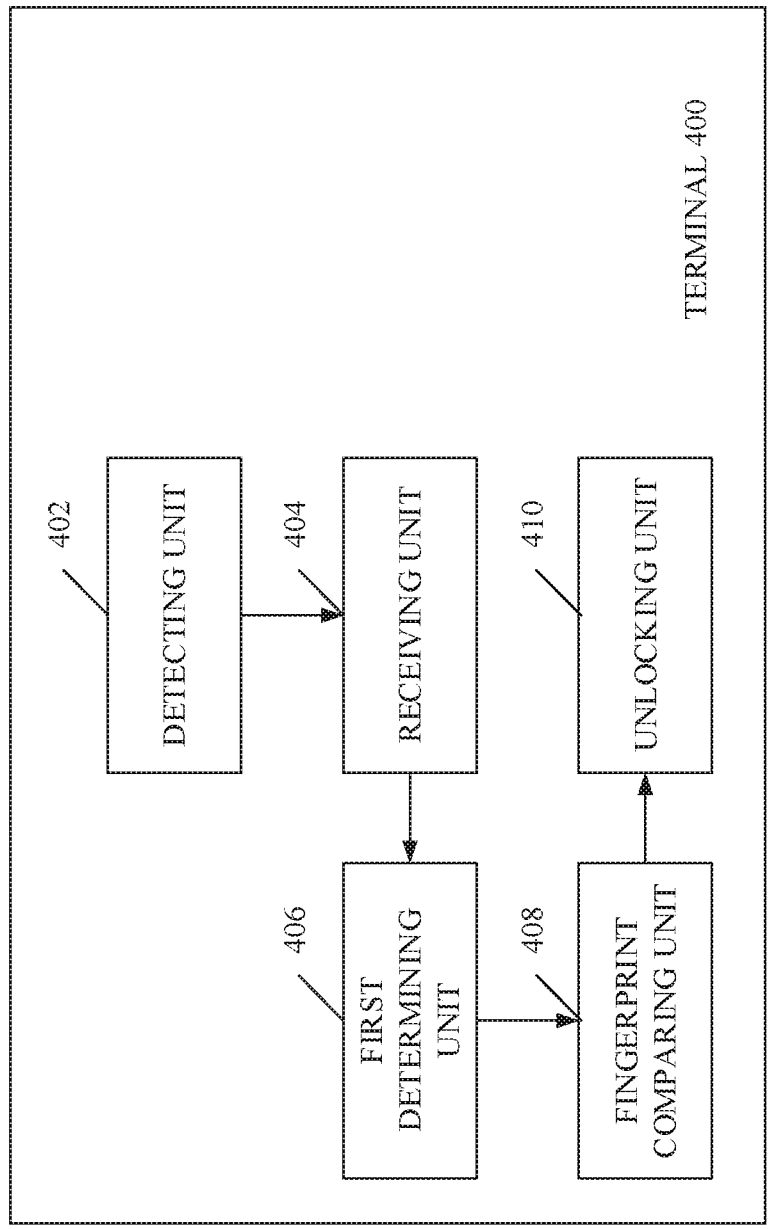
FIG. 4 is a structure schematic diagram illustrating a terminal according to an implementation of the present disclosure.

According to an implementation of the present disclosure, there is provided a terminal 400. As illustrated in FIG. 4, the terminal 400 includes a detecting unit 402, a receiving unit 404, a first determining unit 406, a fingerprint comparing unit 408, and an unlocking unit 410.

The detecting unit 402 is configured to detect a touch operation of a finger of a user on a fingerprint recognition sensor of a terminal.

The receiving unit 404 is configured to receive a first fingerprint image according to a default CAC parameter corresponding to a default finger, and the finger of the user is in the steady state. The default finger can be a wet finger for example.

The receiving unit 404 is further configured to receive N second fingerprint images according to N sets of CAC parameters; N is an integer greater than 1. In at least one implementation, the receiving unit 404 can be divided into two different receiving units, one configured to receive the first fingerprint image while the other configured to receive the second fingerprint image, the present disclosure is not limited thereto.

The first determining unit 406 is configured to determine a target fingerprint image; the target fingerprint image is the best fingerprint image among the first fingerprint image and the N second fingerprint images. For example, the best fingerprint image is a fingerprint image having the best image quality.

The fingerprint comparing unit 408 is configured to perform a fingerprint comparison on the target fingerprint image determined by the first determining unit 406.

The unlocking unit 410 is configured to unlock the terminal when the target fingerprint image is matched.

Figure 5:
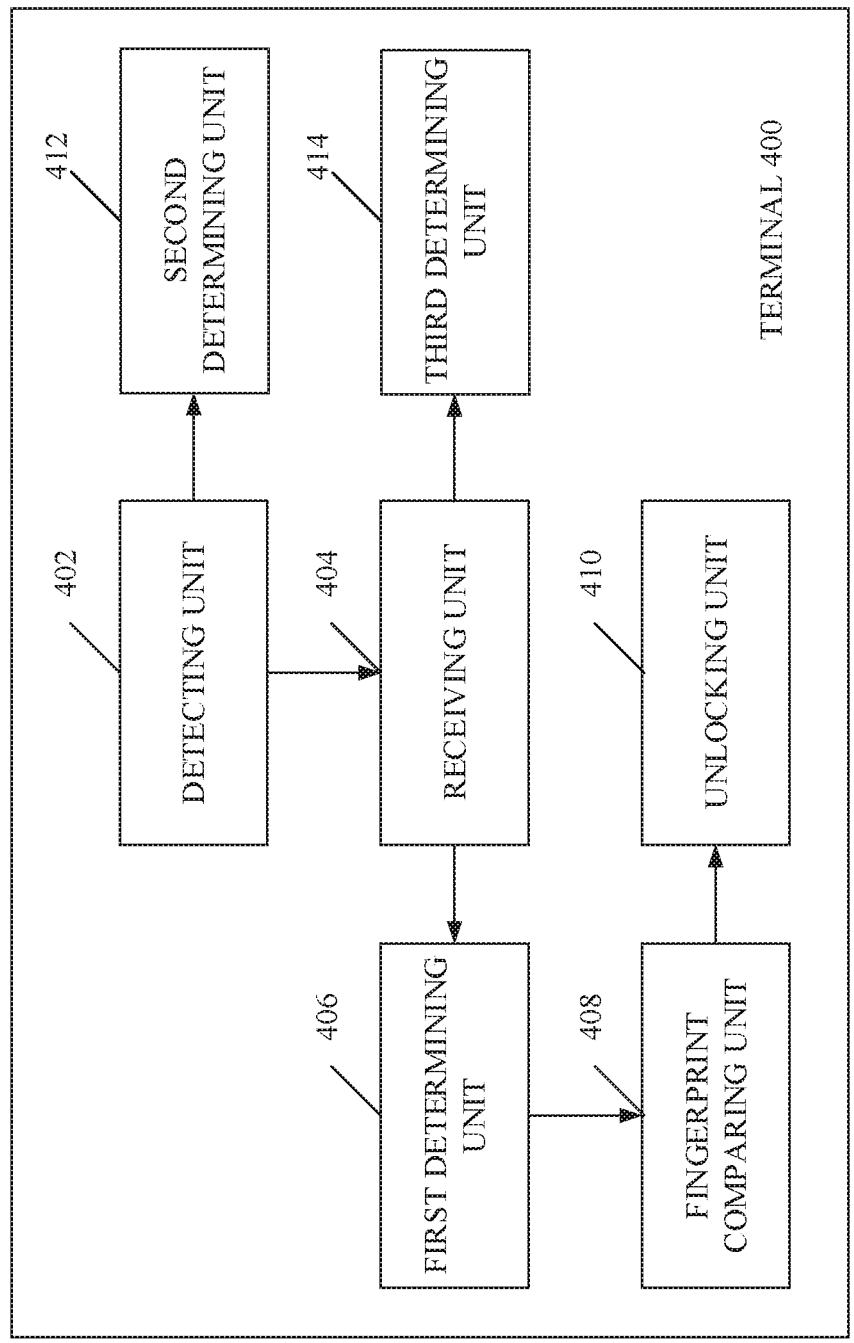
FIG. 5 is another structure schematic diagram illustrating a terminal according to an implementation of the present disclosure.

In at least one implementation, as illustrated in FIG. 5, the terminal can further include a second determining unit 412 configured to determine whether the finger of the user is in a steady state. For the achievement of the determination of whether the finger is in a steady state, the second determining unit 412 can be configured to perform different operations, which will be described below in detail.

In at least one implementation, the receiving unit 404 is further configured to receive at least two third fingerprint images (for example, M third fingerprint images, M is an integer greater than 1), and the second determining unit 412 is configured to determine whether the finger of the user is in the steady state based on the difference between the at least two third fingerprint images. For example, the second determining unit 412 can be configured to: determine the clarity of the M third fingerprint images and determine the difference in the clarity of any two of the M third fingerprint images; determine that the finger of the user is in the steady state when the difference in the clarity of any two of the M third fingerprint images is less than or equal to a first threshold; determine that the finger of the user is not in the steady state when the difference in the clarity of any two of the M third fingerprint images is greater than the first threshold.

In at least one implementation, the fingerprint recognition sensor comprises R sensing electrodes, the receiving unit 404 is further configured receive at least two sets of data via the sensing electrodes of the fingerprint recognition sensor, wherein each set of data comprises R capacitance values, where R is an integer greater than 1. The second determining unit 412 is configured to determine whether the finger of the user is in the steady state based on the difference between the at least two sets of data. For example, the second determining unit 412 is configured to: determine the average value of the difference in the capacitance values of the at least two sets of data; determine that the finger of the user is in the steady state when the average value of the difference in the capacitance values of the at least two sets of data is less than or equal to a second threshold; determine that the finger of the user is not in the steady state when the average value of the difference in the capacitance values of the at least two sets of data is greater than the second threshold.

In at least one implementation, as illustrated in FIG. 5 the terminal further includes a third determining unit 414. The CAC parameter includes an offset of an ADC and a gain of the ADC.

The third determining unit 414 is configured to determine K offsets of the ADC and H gains of the ADC, and construct the N sets of CAC parameters according to the K offsets of the ADC and H gains of the ADC; K and H are integers greater than 1, where each set of the N sets of CAC parameters includes one offset of the ADC and one gain of the ADC.

In at least one implementation, the fingerprint comparing unit 408 is configure to: extract overall features of the target fingerprint image and compare the extracted overall features with overall features of a pre-stored fingerprint template of the terminal; extract local features of the target fingerprint image and compare the extracted local features with local features of the fingerprint template when the similarity between the extracted overall features and the overall features of the pre-stored fingerprint template is greater than or equal to a third threshold; determine that the target fingerprint image is matched when the similarity between the extracted local features and the local features of the pre-stored fingerprint template is greater than or equal to a fourth threshold.

It should be noted that, the components described above, that is, the detecting unit 402, the receiving unit 404, the first determining unit 406, the fingerprint comparing unit 408, the unlocking unit 410, the second determining unit 412, and the third determining unit 414 can be configured to implement corresponding steps of the methods illustrated in FIG. 1 to FIG. 3.

In this implementation, the terminal 400 is presented in the form of units or modules. "Units/Modules" used herein may refer to any one of an application-specific integrated circuit (ASIC), processors for performing one or more software or hardware programs, a memory, an integrated logic circuit, or other components with the above functions.

In the implementations mentioned above, when it mentions that the terminal or the fingerprint recognition sensor receives a fingerprint images, it means the terminal or the fingerprint sensor may get, acquire, obtain or collect the fingerprint image. The terms used above can be interchanged without causing ambiguous.

Figure 6:
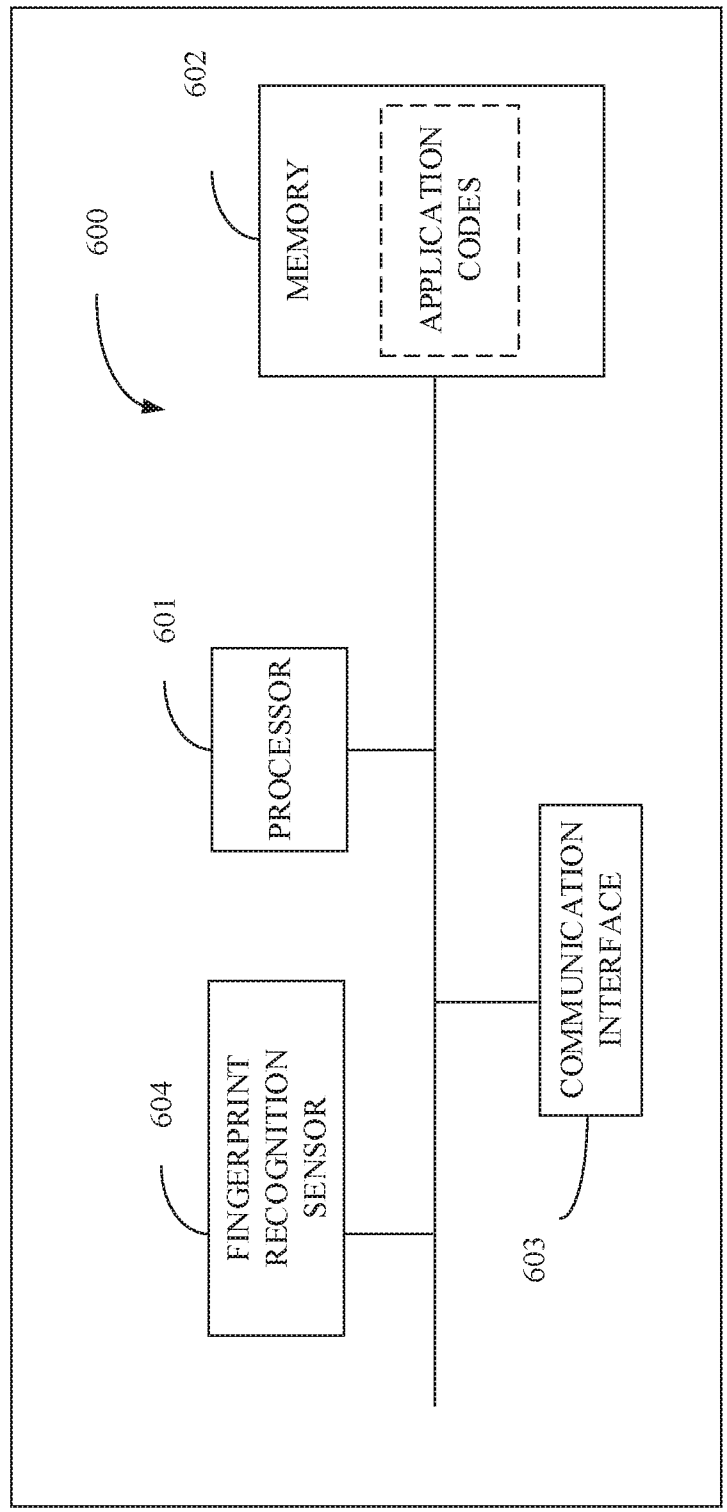
FIG. 6 is a structure schematic diagram illustrating another terminal according to an implementation of the present disclosure.

As illustrated in FIG. 6, a terminal 600 may be implemented in the structure of FIG. 6, and the terminal 600 may include at least one processor 601, at least one memory 602, at least one communication interface 603, and a fingerprint recognition sensor 604. The processor 601, the memory 602, the fingerprint recognition sensor 604, and the communication interface 603 can connect and communicate with each other via a communication bus. Furthermore, the receiving unit 404 illustrated in FIG. 4 can be implemented via the fingerprint recognition sensor 706-6 of the terminal illustrated in FIG. 7; the first determining unit 406, the second determining unit 412, the fingerprint comparing unit 408, the unlocking unit 410, and the third determining unit 414 illustrated in FIG. 4 or FIG. 5 can be implemented via the processor 601 of the terminal 600 illustrated in FIG. 6.

The processor 601 may be one of a central processing unit (CPU), a micro-processor, an application-specific integrated circuit (ASIC), or one or more integrated circuits for controlling the programs for the implementation of above-mentioned technical solutions.

The communication interface 603 is configured to communicate with other devices or communication networks such as Ethernet, radio access network (RAN), wireless local area network (WLAN) and the like.

The memory 602 may be a read-only memory (ROM) or other types of static storage devices that can store static information and instructions, random access memory (RAM) or other types of dynamic storage devices that can store information and instructions, or may be electrically erasable programmable read-only memory (EEPROM), compact disc read-only memory (CD-ROM) or other disc storage media, disc storage media (including compact discs, laser discs, compact discs, digital versatile discs, Blu-ray discs and the like), disk storage media or other magnetic storage devices, or may be any other media that can be used to carry or store program code in the form of instructions or data structures and that can be accessed by a computer. The present disclosure is not limited thereto. The memory can exist independently and connect to the processor 601 via the communication interface 603. The memory can also be integrated with the processor 601.

The memory 602 is configured to store application codes that executes the above-mentioned technical schemes and is controlled by the processor 601. The processor 601 is configured to execute the application codes stored in the memory 602.

The programs codes stored in the memory 602 can be used to perform the method for controlling unlocking of a terminal as illustrated in FIG. 1 to FIG. 3. For example, when a touch operation of the user on a fingerprint recognition sensor of a terminal is detected, a first fingerprint image is received according to a CAC parameter corresponding to a wet finger when the finger of the user is in the steady state; N second fingerprint images are received according to N sets of CAC parameters, and N is an integer greater than 1; a target fingerprint image is determined and a fingerprint comparison is performed on the target fingerprint image, where the target fingerprint image is a fingerprint image having the best image quality among the first fingerprint image and the N second fingerprint images; the terminal is unlocked when the target fingerprint image is matched.

Figure 7:
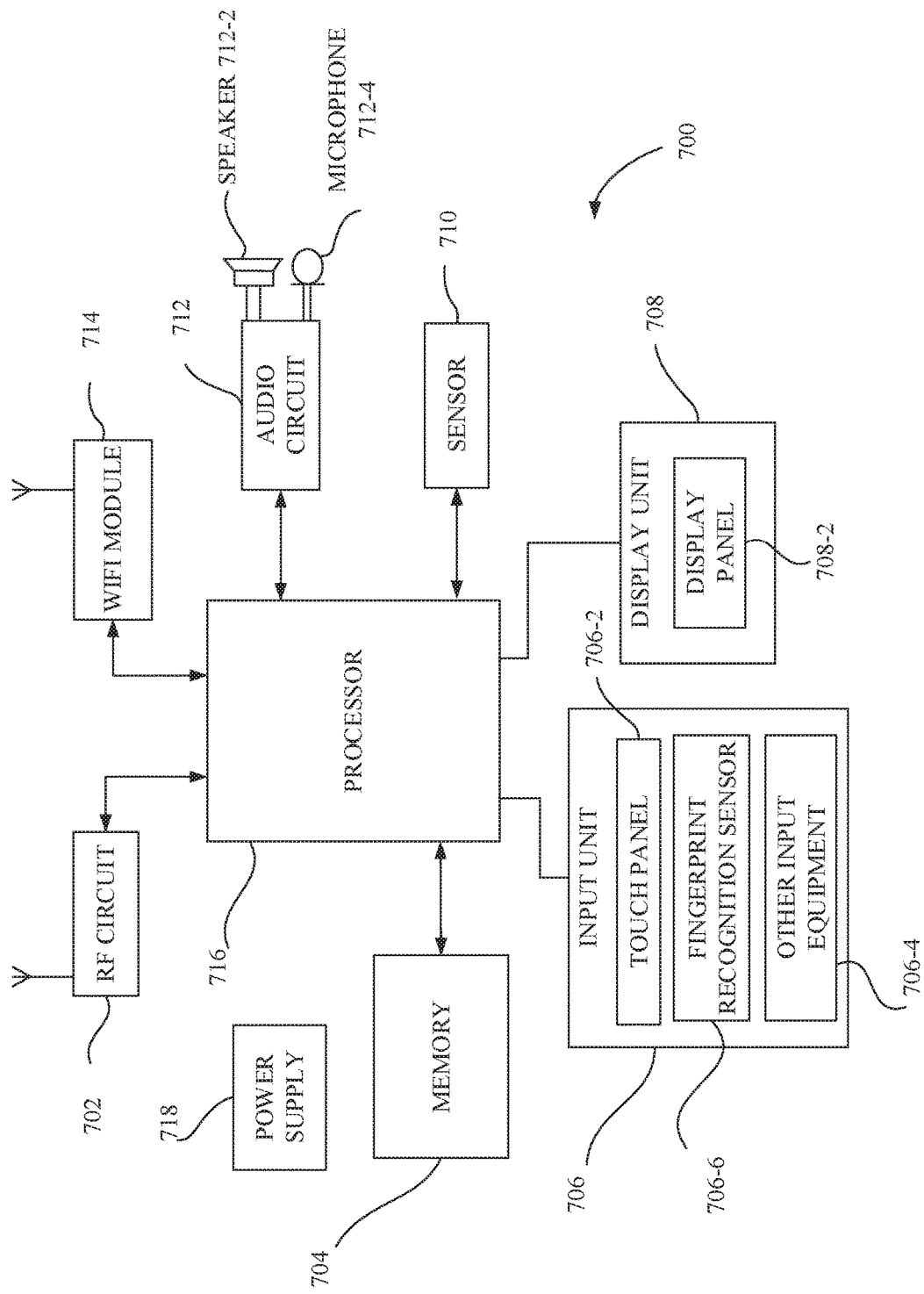
FIG. 7 is a structure schematic diagram illustrating another terminal according to an implementation of the present disclosure.

The implementation of the present disclosure further provides a more specific application scenario in which the terminal is a mobile phone and the following describes components of the mobile phone in detail with refer to FIG. 7. As illustrated in FIG. 7, a mobile phone 700 can includes a RF (radio frequency) circuit 702, a memory 704, an input unit 706, a display unit 708, a sensor 710, an audio circuit 712, a WiFi module 714, a processor 716, and a power supply 718. The input unit 706 further includes a touch panel 706-2, other input device 706-4, and a fingerprint recognition sensor 706-6. The display unit 708 includes a display panel 708-2. The audio circuit 712 is connected with a speaker 712-2 and a microphone 712-4.

The RF circuit 702 is configured for receiving and transmitting signals or transmitting or receiving information during a call, and in particular, receiving downlink information of a base station and transferring the downlink information to the processor 716 for processing, and transmitting uplink data to the base station. Generally, the RF circuit 702 includes but not limited to an antenna, at least one amplifier, a transceiver, coupler, low noise amplifier (LNA), duplexer and the like. In addition, the RF circuit 702 may also communicate with the network and other devices by wireless communication. The above wireless communication may use any communication standard or protocol, which includes but not limited to Global System of mobile communication (GSM), general packet radio service (GPRS), code division multiple access (CDMA), wideband code division multiple access (WCDMA), long term evolution (LTE), E-mail, short messaging service (SMS) and so on.

The memory 704 may be configured to store software programs and modules, and the processor 716 executes various function applications and data processing of the mobile phone by running the software programs and the modules stored in the memory 704. The memory 704 may mainly include a program storage region and a data storage region, the storage program region may store an operation system, application programs for at least one function (a fingerprint image acquisition function, a fingerprint matching function, and an unlocking function) and so on; and the data storage region may store data (such as fingerprint data received by a fingerprint recognition sensor, underlying data for storing a fingerprint image received) created according to use of the mobile phone, and so on. In addition, the memory 704 may include a high-speed RAM, and may further include a non-volatile memory such as one of at least a disk storage device, a flash device, or other non-volatile solid storage devices.

The input unit 706 may be configured to receive input digital or character information and generate key signal input associated with user setting and functional control of the mobile phone. Specifically, the input unit 706 may include a touch panel 706-2, other input devices 706-4 and a fingerprint recognition sensor 706-6. The touch panel 706-2, also referred to as a touch screen, may receive a touch operation of the user thereon or nearby (e.g., operation on or near the touch panel 706-2 by a user using a finger or stylus, or any suitable object or attachment), and drive a corresponding connection device according to a pre-set program. The touch panel 706-2 may include a touch detection device and a touch controller. The touch detection device detects the touching position of the user and detects a signal resulted from the touch operation, and transmits the signal to the touch controller. The touch controller receives the touch information from the touch detection device and converts the information into contact coordinates and sends it to the processor 716, the touch controller can receive and execute the command sent by the processor 716. In addition, the touch panel 706-2 can be realized using various types such as resistive, capacitive, infrared, and surface acoustic waves. In addition to the touch panel 706-2, the input unit 706 may still include other input devices 706-4. The other input devices 706-4 may include, but is not limited to, at least one of a physical keyboard, a function key (such as volume control buttons, switch buttons and so on), a trackball, a mouse, and a joystick. The fingerprint recognition sensor 706-6 may be provided in conjunction with the dome key of the terminal or can be provided in combination with the touch panel 706-2. For example, the fingerprint recognition sensor 706-6 is provided below the touch panel 706-2, when a finger of the user touches the touch panel of the terminal, the fingerprint recognition sensor 706-6 below the touch panel 706-2 can receive a fingerprint image of the finger of the user.

The display unit 708 may be configured to display information input by the user or information provided for the user or various menus of the mobile phone. The display unit 708 may include a display panel 741, and alternatively, the display panel 741 may be configured in the form of a liquid crystal display (LCD), an organic light-emitting diode (OLED) and so on. Further, the touch panel 706-2 may cover the display panel 741. When the touch panel 706-2 detects a touch operation (touch event) thereon or nearby, information of the touch operation can be transmitted to the processor 716 so as to determine the type of the touch event. The processor 716 provides corresponding visual output on the display panel 741 according to the type of the touch event. Although in FIG. 7, the touch panel 706-2 and the display panel 741 are used as two separate components to realize the input and output functions of the mobile phone, in some implementations, the touch panel 706-2 may be integrated with the display panel 741 to implement the input and output functions of the mobile phone.

The mobile phone may also include at least one sensor 710, such as a light sensor, a motion sensor, and other sensors. Specifically, the light sensor may include an ambient light sensor and a proximity sensor, among which the ambient light sensor may adjust the brightness of the display panel 741 according to ambient lights, and the proximity sensor may turn off the display panel 741 and/or backlight when the mobile phone reaches nearby the ear. As a kind of motion sensor, the accelerometer sensor can detect the magnitude of acceleration in all directions (typically three axes, that is, x, y, and z); when stationary, the accelerometer sensor can detect the magnitude and direction of gravity when stationary; the accelerometer sensor can also identify the application of mobile gestures (such as vertical and horizontal screen switch, related games, magnetometer attitude calibration), or the accelerometer sensor can be used for vibration recognition of related functions (such as a pedometer, percussion) and so on. The mobile phone can also be equipped with a gyroscope, barometer, hygrometer, thermometer, infrared sensor and other sensors, and will not repeat here.

The audio circuit 712, the speaker 712-2, the microphone 712-4 may provide an audio interface between the user and the mobile terminal. The audio circuit 712 may convert the received audio data into electrical data and transfer the electrical data to the speaker 712-2; thereafter the speaker 712-2 converts the electrical data into a sound signal for output. On the other hand, the microphone 712-4 converts the received sound signal into an electrical signal which will be received by the audio circuit 712 and converted into audio data to output to the processor 716, the audio data is processed by the output processor 716 and transmitted via an RF circuit 702 to, for example, another mobile phone, or, the audio data is output to the memory 704 for further processing.

WiFi belongs to a short-range wireless transmission technology, the mobile phone may assist the user in E-mail receiving and sending, webpage browsing, access to streaming media and the like by means of the WiFi module 714; WiFi provides users with wireless broadband Internet access. Although illustrated in FIG. 7, it should be understood that the WiFi module 714 is not a necessary part of the mobile phone and can be omitted according to actual needs without departing from the essential nature of the present disclosure.

The processor 716 is the control center of the mobile phone, it uses various interfaces and lines to connect various parts of the whole mobile phone, runs or executes software programs and/or modules stored in the memory 704, and calls data stored in the memory 704 to perform various functions of the mobile phone and process data, thereby monitoring the mobile phone. In at least one implementation, the processor 716 may include one or more processing units; for example, the processor 716 may integrate an application processor and a modem processor, wherein the application processor handles the operating system, the user interface, the application, and so on, and the modem processor mainly processes wireless communication. It will be appreciated that the above-mentioned modem processor may not be integrated into the processor 716.

The mobile phone also includes a power supply 718 (e.g., a battery) that supplies power to various components. For instance, the power supply 718 may be logically connected to the processor 716 via a power management system to enable management of charging, discharging, and power consumption through the power management system. Although not illustrated, the mobile phone may include a camera, a Bluetooth module, etc., and will not be elaborated here. The method of each step in the foregoing implementations can be realized based on the configuration of the terminal illustrated in FIG. 7.

The implementation of the present disclosure also provides a computer readable storage medium. The computer readable storage medium may store a program which, when executed, can accomplish all or part of the steps of the unlocking method described in the above-described method implementation.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the implementations described in the specification are exemplary implementations and the actions and modules involved are not necessarily necessary for the present disclosure.

In the foregoing implementations, descriptions of each implementation are emphasized respectively, and parts which are not elaborated in a certain implementation may subject to relevant descriptions of other implementations.

The apparatus disclosed in implementations provided herein may be implemented in other ways. For example, the device/apparatus implementations described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the implementations.

In addition, the functional units in various implementations of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for controlling unlocking, comprising:
    detecting a touch operation of a finger of a user on a fingerprint recognition sensor of a terminal;
    receiving a first fingerprint image according to a preset capacity auto control (CAC) parameter corresponding to a default finger, wherein the finger of the user is in a steady state;
    receiving N sets of second fingerprint images, according to N sets of CAC parameters, wherein N is an integer greater than 1, during the receiving of the first fingerprint image;
    determining a target fingerprint image, wherein the target fingerprint image is the best fingerprint image among the first fingerprint image and the N sets of second fingerprint images; matching the target fingerprint image;

unlocking the terminal when the target fingerprint image is matched; and determining an application interface that is loaded and displayed the most in a preset time period during the matching the target fingerprint image, and loading and displaying the application interface, wherein the preset time period comprises a current system time.

2. The method of claim 1, further comprising:

before receiving the first fingerprint image, determining whether the finger of the user is in the steady state, wherein determining whether the finger of the user is in the steady state comprises:

receiving at least two third fingerprint images; and determining whether the finger of the user is in the steady state based on a difference between the at least two third fingerprint images.

3. The method of claim 2, wherein determining whether the finger of the user is in the steady state based on the difference between the at least two third fingerprint images comprises:

when a difference in clarity of the at least two third fingerprint images is less than or equal to a first threshold, determining that the finger of the user is in the steady state; and when the difference in the clarity of the at least two third fingerprint images is greater than the first threshold, determining that the finger of the user is not in the steady state.

4. The method of claim 1, wherein the fingerprint recognition sensor comprises R sensing electrodes, and the method further comprises:

determining whether the finger of the user is in the steady state before receiving the first fingerprint image, wherein determining whether the finger of the user is in the steady state comprises:

receiving at least two sets of data via the R sensing electrodes of the fingerprint recognition sensor, wherein each set of the at least two sets of data comprises R capacitance values, and R is an integer greater than 1; and determining whether the finger of the user is in the steady state based on a difference between the at least two sets of data.

5. The method of claim 4, wherein determining whether the finger of the user is in the steady state based on the difference between the at least two sets of data comprises:

when an average value of differences in the R capacitance values of the at least two sets of data is less than or equal to a second threshold, determining that the finger of the user is in the steady state; and when the average value of the differences in the R capacitance values of the at least two sets of data is greater than the second threshold, determining that the finger of the user is not in the steady state.

6. The method of claim 1, wherein the CAC parameter comprises an offset of an analog-to-digital converter (ADC) and a gain of the ADC, and the method further comprises:

before receiving the N sets of second fingerprint images according to the N sets of CAC parameters, determining K offsets of the ADC and H gains of the ADC, wherein K and H are integers greater than 1; and constructing the N sets of CAC parameters according to the K offsets of the ADC and H gains of the ADC, wherein each set of the N sets of CAC parameters comprises one offset of the ADC and one gain of the ADC.

7. The method of claim 1, wherein matching the target fingerprint image comprises:

extracting overall features of the target fingerprint image, and comparing the extracted overall features with overall features of a pre-stored fingerprint template of the terminal;

when the similarity between the extracted overall features of the target fingerprint image and the overall features of the pre-stored fingerprint template is greater than or equal to a third threshold, extracting local features of the target fingerprint image, and comparing the extracted local features with local features of the pre-stored fingerprint template; and when the similarity between the extracted overall features and the overall features of the pre-stored fingerprint template is greater than or equal to a fourth threshold, determining that the target fingerprint image is matched.

8. A terminal, comprising a hardware processor configured to perform:

a detecting unit, configured to detect a touch operation of a finger of a user on a fingerprint recognition sensor of a terminal;

a receiving unit, configured to receive a first fingerprint image according to a default capacity auto control (CAC) parameter corresponding to a default finger, wherein the finger of the user is in a steady state, and receive N second fingerprint images according to N sets of CAC parameters during the receiving of the first fingerprint image, wherein N is an integer greater than 1;

a first determining unit, configured to determine a target fingerprint image, wherein the target fingerprint image is the best fingerprint image among the first fingerprint image and the N second fingerprint images;

a fingerprint comparing unit, configured to match the target fingerprint image; and an unlocking unit, configured to unlock the terminal when the target fingerprint image is matched; and determine an application interface that is loaded and displayed the most in a preset time period during the matching the target fingerprint image, and load and display the application interface, wherein the preset time period comprises a current system time.

9. The terminal of claim 8, wherein the receiving unit is further configured to receive at least two third fingerprint images and the hardware processor is further configured to perform a second determining unit, wherein the second determining unit is configured to:

determine whether the finger of the user is in the steady state based on a difference between the at least two third fingerprint images.

10. The terminal of claim 9, wherein the second determining unit is configured to:

determine clarity of each of the at least two third fingerprint images, and determine a difference in the clarity of the at least two third fingerprint images;

determine that the finger of the user is in the steady state when the difference in the clarity of the at least two third fingerprint images is less than or equal to a first threshold; and determine that the finger of the user is not in the steady state when the difference in the clarity of the at least two third fingerprint images is greater than the first threshold.

11. The terminal of claim 8, wherein
the fingerprint recognition sensor comprises R sensing electrodes,
the receiving unit is further configured to receive at least two sets of data via the R sensing electrodes of the fingerprint recognition sensor, wherein each set of the at least two sets of data comprises R capacitance values, and R is an integer greater than 1, and
the hardware processor is further configured to perform a second determining unit, wherein the second determining unit is configured to:
determine whether the finger of the user is in the steady state based on a difference between the at least two sets of data.

12. The terminal of claim 11, wherein the second determining unit is further configured to:
determine that the finger of the user is in the steady state when an average value of differences in the R capacitance values of the at least two sets of data is less than or equal to a second threshold; and
determine that the finger of the user is not in the steady state when the average value of the differences in the R capacitance values of the at least two sets of data is greater than the second threshold.

13. The terminal of claim 8, wherein the CAC parameter comprises an offset of an analog-to-digital converter (ADC) and a gain of the ADC, and the hardware processor is further configured to perform:
a third determining unit, configured to determine K offsets of the ADC and H gains of the ADC, and construct the N sets of CAC parameters according to the K offsets of the ADC and H gains of the ADC, wherein K and H are integers greater than 1, and each set of the N sets of CAC parameters comprises one offset of the ADC and one gain of the ADC.

14. The terminal of claim 8, wherein the fingerprint comparing unit is configured to:
extract overall features of the target fingerprint image, and compare the extracted overall features with overall features of a pre-stored fingerprint template of the terminal;
extract local features of the target fingerprint image, and compare the extracted local features with local features of the pre-stored fingerprint template when the similarity between the extracted overall features and the overall features of the pre-stored fingerprint template is greater than or equal to a third threshold; and
determine that the target fingerprint image is matched when the similarity between the extracted overall features and the overall features of the pre-stored fingerprint template is greater than or equal to a fourth threshold.

15. A method for controlling unlocking, comprising:
detecting a touch operation of a finger of a user on a fingerprint recognition sensor of a terminal;
receiving a first fingerprint image according to a default capacity auto control (CAC) parameter corresponding to a default finger, where the finger of the user is in a steady state;
receiving N second fingerprint images according to N sets of CAC parameters during the receiving of the first fingerprint image and matching the first fingerprint image, wherein N is an integer greater than 1; and
terminating the reception of the N second fingerprint images, and unlocking the terminal when the first fingerprint is matched; and
determining an application interface that is loaded and displayed the most in a preset time period during the matching the first fingerprint, and loading and displaying the application interface, wherein the preset time period comprises a current system time.

16. The method of claim 15, further comprising:
when the first fingerprint is not matched, determining a target fingerprint image and matching the target fingerprint image, wherein the target fingerprint image is the best fingerprint image among the N second fingerprint images; and
unlocking the terminal when the target fingerprint image is matched.

17. The method of claim 15, further comprising:
before receiving the first fingerprint image, determining whether the finger of the user is in the steady state, wherein determining whether the finger of the user is in the steady state comprises:
receiving at least two third fingerprint images; and
determining whether the finger of the user is in the steady state based on a difference in clarity of the at least two third fingerprint images.

18. The method of claim 15, wherein the fingerprint recognition sensor comprises R sensing electrodes, and the method further comprises:
determining whether the finger of the user is in the steady state before receiving the first fingerprint image, wherein determining whether the finger of the user is in a steady state comprises:
receiving at least two sets of data via the R sensing electrodes of the fingerprint recognition sensor, wherein each set of the at least two sets of data comprises R capacitance values, and R is an integer greater than 1; and
determining whether the finger of the user is in the steady state based on differences in the R capacitance values between each of the at least two sets of data.

* * * * *